Oct. 21, 1941.  R. W. HALL  2,259,522
BRACKET FOR LAMPS AND THE LIKE
Filed June 3, 1940
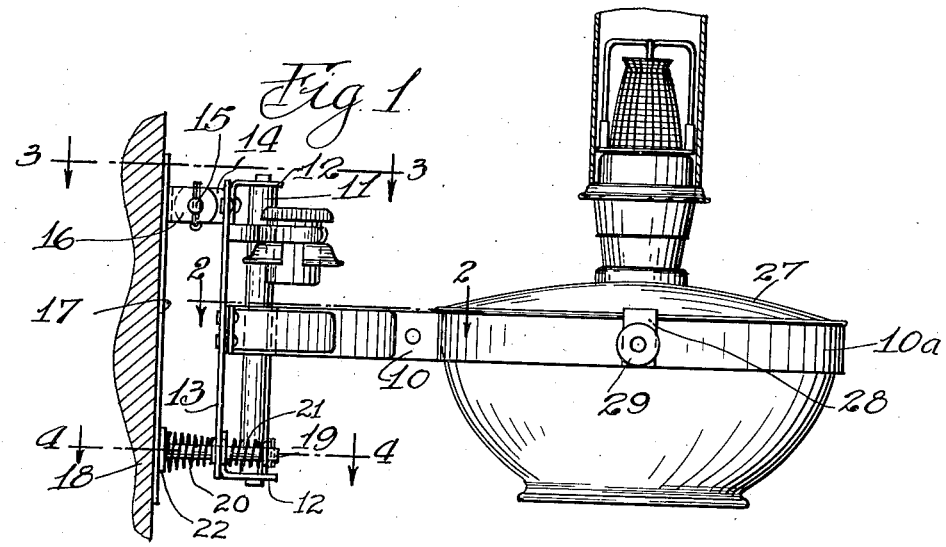
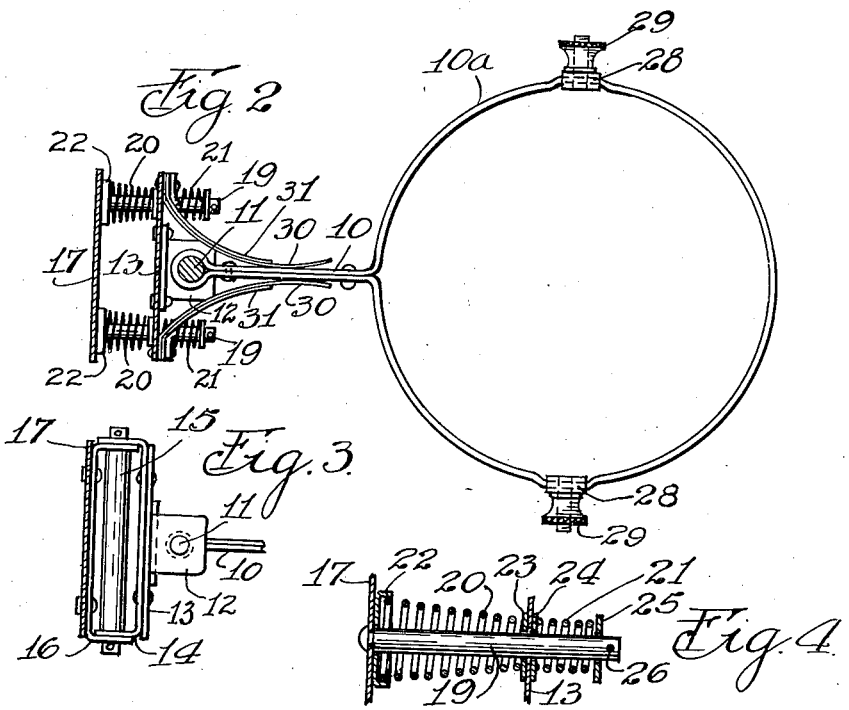
INVENTOR.
ROY W. HALL.
BY Albert C. Bell
ATTORNEY.

Patented Oct. 21, 1941

2,259,522

UNITED STATES PATENT OFFICE 2,259,522

BRACKET FOR LAMPS AND THE LIKE

Roy W. Hall, Oak Park, Ill., assignor to The Mantle Lamp Company of America, Chicago, Ill., a corporation of Illinois Application June 3, 1940, Serial No. 338,499

5 Claims. (Cl. 248—278)

This invention includes an improved construction of a bracket and mounting devices therefor, adapted to support lamps employing mantles as well as other articles from side walls, and particularly so to do in locations where there is considerable vibration and shock, for example on railway cars, boats, automobile trailers, and vehicles generally.

The present invention is an improvement on my earlier invention shown in Patent No. 2,202,-814 issued June 4, 1940. In the construction of said application, provision is made for cushioning vibration or shock that may be exerted on the articles supported by the brackets in a horizontal direction, which construction has been found to serve its intended purpose for many uses and applications. It has been found, however, that in other uses and applications of the bracket, it is desirable to not only cushion vibration or shock that may be horizontally exerted on the supported articles, but to also cushion vibration or shock that may be exerted vertically on said supported articles. It is the purpose of the present invention to provide a construction that will protect articles supported by the brackets, against vibration or shock exerted in any and all directions, so that the supported articles may be protected from injury to the greatest possible extent. This result I accomplish by providing the bracket construction with a supporting plate located vertically between the base of the device and the oscillatory arm employed to support the desired articles from the base, suitable resilient means being provided between the oscillatory arm of the bracket and the supporting plate, and also between the supporting plate and the base of the bracket, the parts being preferably hinge connected in different directions, for example in directions at right angles to each other, so that the resilient means will permit cushioned yielding movement of the supporting arm of the bracket in a first direction, and that the resilient means between the plate and the base will permit cushioned yielding movement of the arm in a second direction preferably at right angles to the first direction of cushioned movement, as a result of which the connections between the parts and the resilient means employed will permit cushioned movement of the arm in any direction.

My invention will be best understood by reference to the accompanying drawing illustrating a preferred embodiment thereof in which:

Fig. 1 shows the bracket construction in side elevation and supporting a lamp of the kind referred to, Fig. 2 is a horizontal, sectional view of the construction shown in Fig. 1 taken along the line 2—2 in Fig. 1, Fig. 3 is a horizontal, sectional view of a part of the construction shown in Fig. 1 taken along the line 3—3 in Fig. 1, and Fig. 4 is a horizontal, sectional view to an enlarged scale of a part of the construction shown in Fig. 1 taken along the line 4—4 in Fig. 1.

Similar numerals refer to similar parts throughout the several views.

As shown in Fig. 1, my improved bracket consists of a supporting arm 10 mounted on a vertically disposed rod 11 having shouldered ends mounted for oscillatory movement in angle members 12 rigidly secured to a supporting plate 13, which plate is disposed in a vertical position, the arm 10 extending therefrom horizontally and substantially at right angles thereto, the support of the arm 10 thus constituting a hinged connection between the arm and the plate 13, permitting horizontal oscillatory movement of the arm 10 relatively to the plate 13.

The plate 13 has secured to its upper end a first bent member 14 engaging a horizontally disposed pivot rod 15 supported by a second bent member 16 which, as more clearly shown in Fig. 3, is of preferably the same size and shape as the bent member 14 to simplify manufacturing the bracket construction. The bent member 16 is rigidly secured to a base 17 provided to be supported in vertical position on any convenient surface, for example a wall 18. The end portions of the bent members 14 and 16 which engage the rod 15 are substantially spaced from each other to impart stability to the hinge connection provided for the plate 13 by the rod 15, so that excepting for wear of the parts and whatever resilience the plate 13 may possess, the plate 13 may only move in an oscillatory manner about the axis of the rod 15.

The arm 10 preferably extends from the mid-portion of the plate 13, and said plate is preferably of sufficient vertical extent so that the angle members 12 are spaced vertically a substantial distance from each other to limit movement of the arm 10 relatively to the plate 13 to horizontal oscillatory movement excepting as wear of the parts and the resilience of the rod 11 may permit a small amount of movement of the arm 10 in other directions. The hinge connection described between the plate 13 and the base 17 is preferably at the upper end portion of said plate, the plate being extended sufficiently below the arm 10 so that cushioning means between the lower end portion of the plate and the base 17 will afford a stable cushioning support for the arm 10.

As shown in Figs. 1 and 2, the resilient means connecting the lower portion of the plate 13 with the base 17 to cushion movement vertically of the arm 10, includes horizontally disposed rods 19 secured to and extending from the base 17 and to and through the plate 13, each of said rods as more clearly shown in Fig. 4 having thereon compression springs 20 and 21, the spring 20 being of helico-spiral construction, with its larger end disposed for engagement with a centering collar 22 on the rod 19, the other end of the spring resting against a washer 23 adjacent the plate 13. The projecting end of the rod 19 supports the spring 21 between a first washer 24 adjacent the plate 13 and a second washer 25 held on the rod by a pin 26. The plate 13 is provided with a clearance opening around the rod 19 which is covered by the washers 23 and 24. The normal condition of the springs 20 and 21 is such that with an intended load on the arm 10, the springs 20 will be somewhat compressed to support the load and for that condition the arm 10 will be in substantially horizontal position, the springs 20 and 21 being so proportioned that for the loaded condition of the springs 20 referred to, the springs 21 will be sufficiently compressed to receive and cushion shocks that may be exerted upwardly on the arm 10 for any reason incident to the use of the bracket, the springs 20 as described being at the same time in somewhat compressed condition due to the load on the arm 10, so that they may effectively cushion shocks or impacts that may be exerted downwardly on the arm 10.

As shown in Fig. 2, the outer end of the arm 10 is formed into a ring 10a to support the intended load, for example a mantle lamp 27, retaining clips 28 controlled by thumb nuts 29 being provided to hold the lamp in place in the ring. The arm 10 is preferably formed of a flat strip of sheet metal bent to circular form at its mid-portion and having its end portions adjacent each other and riveted together to form the body portion of the arm, the extreme end portions of the arm being formed around the rod 11 and tightly held in engagement therewith by rivets extending through the arm structure, or by equivalent fastening devices, as preferred. The body portion of the arm 10 is engaged on opposite sides by leaf springs 30 of sufficient initial tension to restrain the arm 10 against a large oscillatory movement on its hinge connection with the plate 13, the tendency of the springs 30 being to maintain the arm in a position substantially at right angles to the plate 13. Reinforcing leaf springs 31 are preferably provided which engage the springs 30 to supplement their action in the event substantial shocks or impacts are exerted on the arm 10 horizontally. The leaf springs 30 and 31 are preferably supported by securely fastening them to the plate 13 as indicated in Figs. 2 and 3.

As a result of the construction described, with the rod 11 in a substantially vertical position and the rod 15 in a substantially horizontal position, it will be observed that the hinge-connection afforded by the rod 11, and the springs 30 and 31 will permit cushioned oscillatory movement of the arm 10 horizontally, and that the hinge-connection afforded by the rod 15 and the springs 20 and 21 will permit cushioned oscillatory movement of the arm 10 vertically. It will also be understood that diagonally or obliquely exerted impacts on the arm 10 will be resolved into corresponding vertical and horizontal components which will tend to produce both vertical and horizontal oscillatory movements of the arm 10, each of which movements will be cushioned by the corresponding springs in the manner described so that the construction effectively cushions shocks or impacts exerted in any direction on the arm 10. It will also be understood that while the rods 11 and 15 are illustrated in vertical and horizontal positions respectively, they may be given any other position as preferred, and that as long as they extend in directions crossing each other and preferably at right angles to each other, and the cushioning springs are related to them in substantially the manner above described, the construction will effectively cushion shocks or jars on the arm 10 regardless of the direction in which they may be exerted.

While I have shown my invention in the particular embodiment above described, it is understood that I do not limit myself thereto and I may employ equivalent thereof without departing from the scope of the appended claims.

Having thus described my invention, what I claim is:

1. In a bracket of the class described, the combination of a base for attachment to a supporting means, a supporting plate having a first and freely movable hinge connection with said base on a horizontal axis, first resilient means between said plate and said base cushioning relative movement of said base and said plate on said hinge connection, a supporting arm having a second and freely movable hinge connection with said plate on a vertical axis, and second resilient means between said arm and said plate cushioning movement of said arm relatively to said plate on said second hinge connection.

2. In a bracket of the class described, the combination of a base for attachment to a supporting means, a supporting plate having a first and freely movable hinge connection with said base on a horizontal axis, first resilient means between said plate and said base cushioning relative movement of said base and said plate on said hinge connection, a supporting arm having a second and freely movable hinge connection with said plate on a vertical axis, and second resilient means between said arm and said plate cushioning movement of said arm relatively to said plate on said second hinge connection, said first resilient means including opposed springs engaging said plate in balanced relation.

3. In a bracket of the class described, the combination of a base for attachment to a supporting means, a supporting plate having a first and freely movable hinge connection with said base on a horizontal axis, first resilient means between said plate and said base cushioning relative movement of said base and said plate on said hinge connection, a supporting arm having a second and freely movable hinge connection with said plate on a vertical axis, and second resilient means between said arm and said plate cushioning movement of said arm relatively to said plate on said second hinge connection, said first resilient means including a rod secured to and extending from said base loosely through said plate and spaced from said first hinge connection, and a compression spring on said rod on each side of and engaging said plate, the pressures of said springs on said plate being opposed to each other.

4. In a bracket of the class described, the combination of a base for attachment to a supporting means, a supporting plate having a first and freely movable hinge connection with said base on a horizontal axis, first resilient means between said plate and said base cushioning relative movement of said base and said plate on said hinge connection, a load supporting arm having a second and freely movable hinge connection with said plate on a vertical axis, and second resilient means between said arm and said plate cushioning movement of said arm relatively to said plate on said second hinge connection, said first resilient means including two rods each secured to and extending from said base loosely through said plate, said rods being in a horizontal plane spaced substantially vertically from said first hinge connection, a compression spring on each of said rods on each side of said plate for cushioning vertical impacts on said arm, said rods being spaced a substantial distance from each other horizontally to in part resist oscillation tendency horizontally of said arm.

5. In a bracket of the class described, the combination of a base, a supporting plate pivotally connected with said base for impact oscillation in a first direction, a load supporting arm pivotally connected with said plate for impact oscillation in a second direction, first resilient means associated with said plate and cushioning oscillatory movement of said plate on its said pivotal connection, and second resilient means associated with said arm and cushioning oscillatory movement of said arm on its said pivotal connection.

ROY W. HALL.